US008925306B2

(12) United States Patent
Ikeda et al.

(10) Patent No.: US 8,925,306 B2
(45) Date of Patent: Jan. 6, 2015

(54) EXHAUST GAS PURIFICATION SYSTEM FOR HIGH ALTITUDE USE

(75) Inventors: Takashi Ikeda, Fujisawa (JP); Takayuki Mukunashi, Fujisawa (JP); Tetsuya Asami, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 121 days.

(21) Appl. No.: 13/699,503

(22) PCT Filed: May 16, 2011

(86) PCT No.: PCT/JP2011/061216
§ 371 (c)(1),
(2), (4) Date: Nov. 21, 2012

(87) PCT Pub. No.: WO2011/148813
PCT Pub. Date: Dec. 1, 2011

(65) Prior Publication Data

US 2013/0061582 A1 Mar. 14, 2013

(30) Foreign Application Priority Data

May 25, 2010 (JP) ................................ 2010-119717

(51) Int. Cl.
*F01N 3/00* (2006.01)
*F01N 3/023* (2006.01)
*F02D 41/02* (2006.01)
*F02D 41/40* (2006.01)
*F01N 9/00* (2006.01)
*F01N 3/035* (2006.01)

(52) U.S. Cl.
CPC ............ *F01N 3/023* (2013.01); *F02D 41/0245* (2013.01); *F02D 41/029* (2013.01); *F02D 41/405* (2013.01); *F01N 9/002* (2013.01); *F02D 2200/101* (2013.01); *F02D 2200/703* (2013.01); *Y02T 10/44* (2013.01); *Y02T 10/26* (2013.01); *F01N 3/0235* (2013.01); *F01N 3/035* (2013.01)
USPC .................... 60/295; 60/286; 60/297; 60/311

(58) Field of Classification Search
USPC ............................ 60/286, 295, 297, 303, 311
See application file for complete search history.

(56) References Cited

U.S. PATENT DOCUMENTS 7,640,727 B2 * 1/2010 Kitahara ........................ 60/285
7,797,097 B2 * 9/2010 Kawamura et al. .......... 701/103

(Continued)

FOREIGN PATENT DOCUMENTS

JP 2000-303826 10/2000
JP 2002-115584 4/2002

(Continued)

OTHER PUBLICATIONS

Written Opinion of the International Searching Authority mailed Jun. 21, 2011 in corresponding International Application No. PCT/JP2011/061216.

(Continued)

*Primary Examiner* — Binh Q Tran
(74) *Attorney, Agent, or Firm* — Staas & Halsey LLP

(57) ABSTRACT

When a diesel particulate diffuser ("DPD") of a vehicle traveling in a normal drive mode in the upland area is to be automatically regenerated by raising a temperature of exhaust gas from an engine, an exhaust gas purification system determines an upland full-load injection quantity from the atmospheric pressure in the upland area and an engine speed while the vehicle is in motion and drives the vehicle with the injection quantity determined. The system determines, during the regeneration mode, an upland drive regeneration injection quantity obtained by decreasing the upland full-load injection quantity on the basis of a quantity required for the post-injection. The injection quantity is gradually decreased from the upland full-load injection quantity to the upland regeneration drive injection quantity when the vehicle shifts from the normal drive mode in the upland area to the upland regeneration mode, so that the decreased quantity is used for the post-injection.

6 Claims, 3 Drawing Sheets

MANUAL REGENERATION (ORANGE) AUTOMATIC REGENERATION (GREEN) ECU VEHICLE SPEED SENSOR ATMOSPHERIC PRESSURE SENSOR

(56) References Cited

U.S. PATENT DOCUMENTS

| | | | | |
|---|---|---|---|---|
| 7,849,677 | B2 * | 12/2010 | Matsuno et al. | 60/295 |
| 8,109,082 | B2 * | 2/2012 | Marcelot et al. | 60/295 |
| 8,407,989 | B2 * | 4/2013 | Leustek et al. | 60/295 |
| 2005/0217252 | A1 | 10/2005 | Sato et al. | |

FOREIGN PATENT DOCUMENTS

| | | |
|---|---|---|
| JP | 2002-235589 | 8/2002 |
| JP | 2004-245175 | 9/2004 |
| JP | 4175281 | 10/2005 |
| JP | 2008-150966 | 7/2008 |

OTHER PUBLICATIONS

Patent Abstracts of Japan, Publication No. 2000-303826, Published Oct. 31, 2010.

Patent Abstracts of Japan, Publication No. 2002-115584, Published Apr. 19, 2002.

Patent Abstracts of Japan, Publication No. 2002-235589, Published Aug. 23, 2002.

Patent Abstracts of Japan, Publication No. 2004-245175, Published Sep. 2, 2004.

Patent Abstracts of Japan, Publication No. 2008-150966, Published Jul. 3, 2008.

International Search Report of PCT/JP2011/061216 mailed Jun. 21, 2011.

* cited by examiner

EXHAUST GAS PURIFICATION SYSTEM FOR HIGH ALTITUDE USE

CROSS REFERENCE TO RELATED APPLICATIONS

This application claims the foreign priority benefit of Japanese Application No. 2010-119717 filed May 25, 2010, the contents of which are incorporated herein by reference, which serves as priority for PCT Application No. JP2011/061216 filed May 16, 2011.

TECHNICAL FIELD

The present invention relates to an exhaust gas purification system that traps PM (Particulate Matter) contained in exhaust gas from a diesel engine as well as exhausts NOx upon purification. Particularly, the present invention relates to an exhaust gas purification system in an upland area that can regenerate a Diesel Particulate Diffuser ("DPD") without degrading normal drive performance in an upland area.

BACKGROUND ART

As the exhaust gas purification system that purifies and exhausts the exhaust gas from the diesel engine, there has been developed an exhaust gas purification system in which DPD and SCR (Selective Catalytic Reduction) devices are connected to an exhaust pipe.

In this exhaust gas purification system, the DPD traps the PM contained in the exhaust gas. Moreover, in the exhaust gas purification system, an SCR system including the SCR device supplies an aqueous urea solution stored in a urea tank to the upstream of the exhaust gas in the SCR to generate ammonia by the heat of the exhaust gas. NOx is reduced by the ammonia on an SCR catalyst and purified (refer to Patent Documents 1 and 2, for example).

The PM trapped and accumulated in the DPD needs to be oxidized and removed to regenerate the DPD as appropriate in order to prevent clogging in a filter.

The clogging is detected by an exhaust pressure sensor that detects the differential pressure between the front and the back of the DPD. When the differential pressure has reached the upper limit, an ECU (Engine Control Unit) starts regenerating the DPD either automatically or manually. In the manual regeneration, the DPD starts regenerating once the ECU has turned on a DPD alarm lamp provided in a cabin and a driver has pressed a regeneration execution switch.

The DPD is regenerated by performing multi-injection of a fuel (pilot injection, pre-injection, main injection, and after-injection) to raise the exhaust temperature equal to or higher than a catalyst activation temperature of the DPD, followed by post-injection in addition to the multi-injection to raise the exhaust temperature up to approximately 600° C., thereby combusting and removing the PM trapped in the DPD by the high-temperature exhaust gas.

The DPD is regenerated automatically while a vehicle is in motion. Hence, the drive performance is determined by a full-load injection quantity of the fuel that is set intentionally low in a normal drive mode in consideration of a fuel quantity to be injected by the post-injection at the time of regeneration.

Now, when the vehicle travels in an upland area, i.e., at high altitudes of 2000 m and 3000 m where the air (oxygen) is thin, the atmospheric pressure is reduced to approximately 80 kPa (at 2000 m) and approximately 70 kPa (at 3000 m) as compared to approximately 100 kPa at an altitude of 0 m, thereby requiring engine performance at full load to be degraded.

PRIOR ART DOCUMENTS

Patent Document 1: Japanese Patent Application Publication No. 2000-303826

Patent Document 2: Japanese Patent No. 4175281

In order to improve drivability of the vehicle traveling in the upland area in the normal drive mode, it is preferable to improve the engine performance. However, when a turbo vehicle attempts to improve full-load performance in the upland area by increasing supercharging pressure, the supercharging pressure would increase relatively to the atmospheric pressure in the upland area, thereby causing excessive rotation of a turbine and possible damage thereto. Thus, the absolute supercharging pressure is typically decreased. When it is attempted to increase the full-load injection quantity of the fuel to improve the engine performance in the upland area where oxygen is thin, there would be a problem in which, when the DPD is to be regenerated (in a regeneration mode), an air-fuel ratio is decreased to the extent that there is not enough oxygen left in the gas after in-cylinder combustion to perform the post-injection, whereby the regeneration would not be completed (the temperature of the exhaust gas would not be increased sufficiently).

Accordingly, the engine performance in the normal drive mode needs to be set in consideration of the case where the DPD is regenerated in the upland area. When the full-load injection quantity is set in consideration of the post-injection performed at the time of regenerating the DPD, however, there is a problem that the engine performance in the upland area would be degraded. Such request for the engine performance in the upland area is directly linked to marketability, and thus it is required to maintain the performance as much as possible.

Now, in the normal drive mode, the full-load injection quantity of the fuel can be set in the condition where there is near a theoretical air-fuel ratio, and can be divided into the quantity for driving and the quantity for the post-injection when the vehicle is in the regeneration mode. However, there would be an abrupt decrease in torque when the vehicle enters the regeneration mode and an abrupt increase in the torque when the regeneration is completed, thereby greatly impairing the drivability.

SUMMARY OF THE INVENTION

Accordingly, an object of the present invention is to solve the aforementioned problems and to provide the exhaust gas purification system in an upland area capable of maintaining the engine performance when the vehicle travels in the upland area in the normal drive mode, securing the amount of oxygen required for the post-injection in the regeneration mode, and switching between the normal mode and the regeneration mode without incongruity.

To achieve the object described above, there is provided an exhaust gas purification system in an upland area, including: a DPD connected to an exhaust pipe of a diesel engine for trapping PM contained in exhaust gas, the exhaust gas purification system having a regeneration mode for automatically regenerating the DPD by performing multi-injection and post-injection to raise a temperature of the exhaust gas from the diesel engine when an amount of the PM in the DPD has reached a certain amount or more during a normal drive mode, wherein the exhaust gas purification system determines an upland full-load injection quantity from atmospheric pressure in an upland area and an engine speed when a vehicle is in motion in the normal drive mode in the upland area and drives the vehicle with the injection quantity determined, determines an upland drive regeneration injection quantity obtained by decreasing the upland full-load injection quantity on the basis of a quantity required for the post-injection when the vehicle is in the regeneration mode, gradually decreases an injection quantity from the upland full-load injection quantity to the upland regeneration drive injection quantity when the vehicle switches from the normal drive mode in the upland area to an upland regeneration mode and, by using the decreased quantity for the post-injection, increases the injection quantity from the upland regeneration drive injection quantity to the upland full-load injection quantity after the regeneration is completed.

There is also provided a map in which a full-load injection quantity of a fuel corresponding to the engine speed is set on the basis of an air-fuel ratio for each atmospheric pressure in the upland area, wherein the upland full-load injection quantity required in the normal drive mode in the upland area is determined by the map on the basis of the atmospheric pressure at the altitude in the upland area and the engine speed while the vehicle is in motion.

The upland full-load injection quantity required in the normal drive mode in the upland area can be determined by the engine speed on the basis of a full-load performance characteristic line that is based on the altitude and selected from the map.

During the regeneration mode, the temperature of the exhaust gas can be raised to a catalyst activation temperature of the DPD or higher by performing the multi-injection while decreasing the upland full-load injection quantity to the upland regeneration drive injection quantity to be used in the normal drive mode, and a difference between the upland regeneration drive injection quantity and the upland full-load injection quantity is allotted to the post-injection.

The present invention can exert superior effects in which: the vehicle travels with an upland full-load injection quantity with which the maximum engine performance can be obtained based on the atmospheric pressure when traveling in the normal drive mode in the upland area; the DPD can be regenerated without difficulty by traveling with an upland regeneration drive injection quantity when the vehicle is in the regeneration mode, the upland regeneration drive injection quantity being equal to the upland full-load injection quantity minus the quantity required for the post-injection; and the injection quantity of the fuel is decreased from the upland full-load injection quantity down to the upland regeneration drive injection quantity when the vehicle starts regenerating and increased back to the upland full-load injection quantity after the regeneration is completed, thereby causing no abrupt change in the torque and retaining excellent drivability.

DETAILED DESCRIPTION

Preferred embodiments of the present invention will be described below in detail with reference to the attached drawings.

Figure 1:
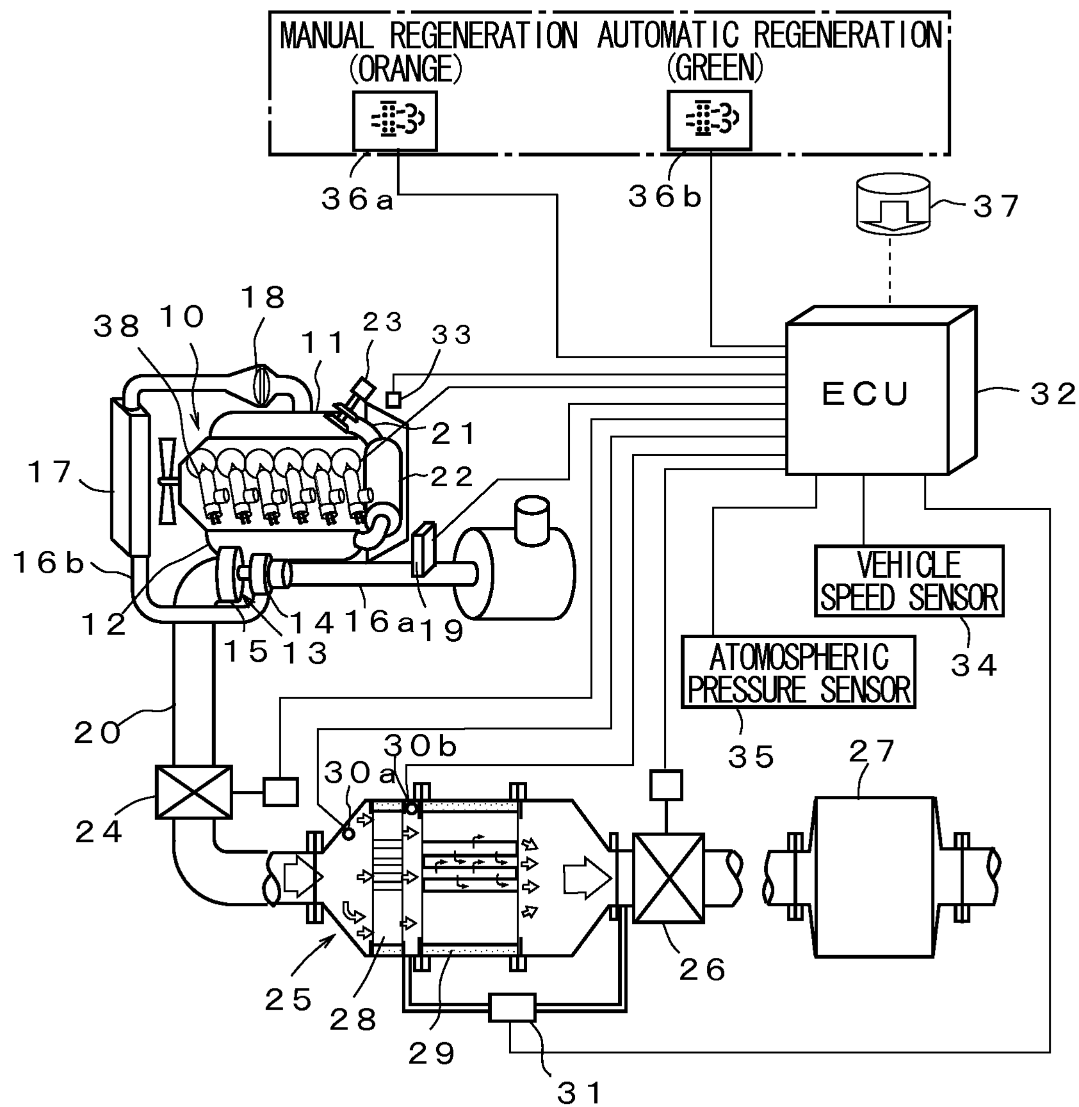
FIG. 1 is an overall structural diagram illustrating an embodiment of the present invention.

As illustrated in FIG. 1, an intake manifold 11 and an exhaust manifold 12 of a diesel engine 10 is connected to a compressor 14 and a turbine 15 of a supercharger 13, respectively. The air from an upstream-side air-intake passage 16*a* is boosted by the compressor 14, cooled by passing through an intercooler 17 provided in a downstream-side air-intake passage 16*b*, and supplied to the diesel engine 10 from the intake manifold 11 via an intake throttle valve 18. The exhaust gas from the diesel engine 10 is exhausted into an exhaust pipe 20 after driving the turbine 15.

An air mass flow sensor (MAF) 19 for measuring the intake air volume is provided to the upstream-side air-intake passage 16*a* in order to control the opening of the intake throttle valve 18 and regulate the intake air volume. In addition, the exhaust pipe 20 and the upstream-side air-intake passage 16*a* are connected to an EGR (Exhaust Gas Recirculation) passage 21 for returning a portion of the exhaust gas back into the intake system of the engine 10 to reduce NOx, and the EGR passage 21 is connected to an EGR cooler 22 and an EGR valve 23.

The exhaust pipe 20 is connected to an exhaust brake valve 24, a DPD 25, an exhaust throttle valve 26, and a silencer 27. The DPD 25 includes a Diesel Oxidation Catalyst ("DOC") 28 formed of an active catalyst that oxidizes an unburned fuel, and a CSF (Catalyzed Soot Filter) 29 that traps PM contained in the exhaust gas. Although not shown in the figure, an SCR device for denitrating NOx by ammonia is also connected between the exhaust throttle valve 26 and the silencer 27.

Also provided are exhaust gas temperature sensors 30*a* and 30*b* provided at the front and back of the DOC 28 and a differential pressure sensor 31 that detects the amount of the PM accumulated in the CSF 29. These detected values are input into an ECU (Engine Control Unit) 32.

Input into the ECU 32 are values detected by an engine speed sensor 33 for detecting the engine speed, a vehicle speed sensor 34, and an atmospheric pressure sensor 35.

While the vehicle is in motion, the ECU 32 controls the quantity of the fuel injected from a fuel injector 38 according to the degree of opening of an accelerator, and controls the intake throttle valve 18, the exhaust brake valve 24, and the exhaust throttle valve 26 as appropriate.

In this exhaust gas treatment system, the ECU 32 is adapted to regenerate the DPD by raising the temperature of the exhaust gas from the diesel engine 10 to 600° C. and combusting the PM, when it is determined that a certain amount of the PM has been accumulated in the DPD 25 by the value detected by the differential pressure sensor 31 that detects the differential pressure between the front and the back of the CSF 29, or when a distance traveled since the last regeneration has reached a predetermined value.

In this regeneration, the fuel injector 38 performs multi-injection (pilot injection, pre-injection, main injection, and after-injection) to raise the temperature of the exhaust gas to a catalyst activation temperature of the DOC 28 or higher and thereafter proceeds to post-injection in order to raise the temperature of the exhaust gas to 600° C. and combust the PM. Although the DPD is normally regenerated automatically while the vehicle is in motion, the manual regeneration is adopted to reduce the dilution amount of lubricant oil produced when the fuel oil is mixed into the lubricant oil in a cylinder by the post-injection.

In the automatic regeneration, the ECU 32 regenerates the DPD 25 by throttling the intake throttle valve 18, closing the EGR valve 23, and performing the multi-injection to raise the temperature of the exhaust gas to 250° C. or the catalyst activation temperature of the DOC 28, followed by the post-injection in addition to the multi-injection in order to raise the temperature of the exhaust gas to 600° C. and combust the PM. The intake throttle valve 18 and the EGR valve 23 are returned to the normal control after the regeneration is completed. The ECU 32 turns on an automatic regeneration alarm lamp 36*b* during the automatic regeneration.

In the manual regeneration, the ECU 32 gives a manual regeneration alarm by blinking a manual regeneration alarm lamp 36*a*. In response to this alarm, a driver stops the vehicle and presses a DPD manual regeneration execution switch 37 to start the manual regeneration.

In the manual regeneration, the ECU 32 regenerates the DPD 25 by increasing the engine speed from an idle speed, throttling the intake throttle valve 18, closing the EGR valve 23 and the exhaust brake valve 24, and performing the multi-injection to raise the temperature of the exhaust gas to the catalyst activation temperature or higher. After raising the temperature, the ECU 32 opens the exhaust brake valve 24, closes the exhaust throttle valve 26, and adds the post-injection to the multi-injection in order to raise the temperature of the exhaust gas to 600° C. and combust the PM.

The aforementioned automatic regeneration is the regeneration mode when the vehicles travels at the altitudes of 0 to 2000 m in the normal drive mode. When the automatic regeneration (an upland regeneration mode) is attempted at the altitude beyond 2000 m, however, there would be less oxygen available for the post-injection.

Figure 3A:
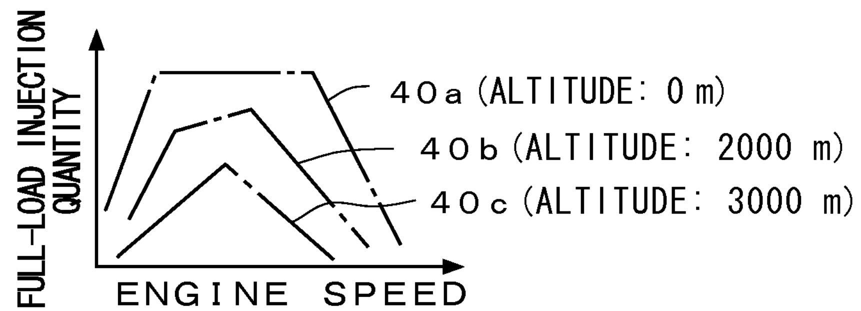
FIGS. 3(*a*) to 3(*c*) are graphs illustrating a relationship between an engine speed and the full-load injection quantity at each altitude of the present invention where the vehicle is in: (a) the normal drive mode; (b) a decrease mode during which the vehicle shifts from the normal drive mode to the regeneration mode; and (c) an increase mode during which the vehicle returns to the normal drive mode upon completion of the regeneration mode.
Figure 3B:
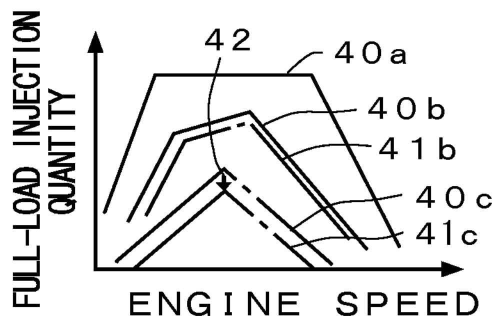
Figure 3C:
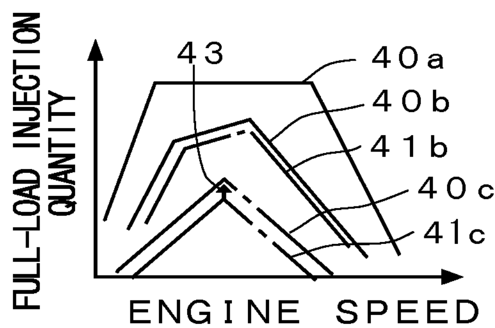

Now, as illustrated in FIG. 3(*a*), a map of the full-load injection quantities of the fuel corresponding to the engine speed is stored in the ECU 32 for each altitude (altitudes of 0 m, 2000 m, and 3000 m, for example). In FIG. 3(*a*), 40*a* represents a full-load performance characteristic line of the engine speed and the full-load injection quantity at the altitude of 0 m, 40*b* represents a full-load performance characteristic line of the engine speed and the full-load injection quantity at the altitude of 2000 m, and 40*c* represents a full-load performance characteristic line of the engine speed and the full-load injection quantity at the altitude of 3000 m.

As illustrated in the map of FIG. 3(*a*), the ECU 32 determines the full-load injection quantity of the fuel from the altitude based on the engine speed detected by the engine speed sensor 33 and the atmospheric pressure detected by the atmospheric pressure sensor 35 and drives the vehicle, such that the vehicle can obtain the maximum engine performance according to the oxygen concentration when traveling at the altitudes of 2000 m and 3000 m in the upland normal mode.

The ECU 32 determines the altitude at which the vehicle is traveling on the basis of the atmospheric pressure detected by the atmospheric pressure sensor 35 and drives the vehicle in the upland normal drive mode on the basis of the full-load performance characteristic lines 40*b* and 40*c* in the map of FIG. 3(*a*). Altitudes between 2000 m and 3000 m would be interpolated as appropriate on the basis of the full-load performance characteristic lines 40*b* and 40*c* to determine the full-load injection quantity.

When the vehicle switches to the regeneration mode while traveling in the upland normal drive mode, the fuel injected by the post-injection cannot be combusted due to the lack of oxygen, the regeneration mode regenerating the DPD 25 automatically. Therefore, the ECU 32 determines the upland drive regeneration injection quantity decreased from the upland full-load injection quantity on the basis of the quantity required for the post-injection.

FIGS. 3(*b*) and 3(*c*) illustrate upland regeneration drive characteristic lines 41*b* and 41*c* obtained by subtracting the quantity required for the post-injection from the full-load performance characteristic lines 40*b* and 40*c* at the altitudes of 2000 m and 3000 m. In the regeneration mode, the ECU 32 determines the upland regeneration drive injection quantity from the engine speed on the basis of the upland regeneration drive characteristic lines 41*b* and 41*c* to drive the vehicle.

At this time, the engine performance of the vehicle in motion would be degraded abruptly when the upland full-load injection quantity is directly decreased to the upland drive regeneration injection quantity. Hence, as illustrated in FIG. 3(*b*), the injection quantity of the fuel is gradually decreased from the upland full-load injection quantity down to the upland drive regeneration injection quantity as indicated by an arrow 42, thereby improving the drivability.

The injection quantity of the fuel is preferably decreased during the multi-injection because, as described above, the regeneration operation is performed by raising the temperature of the exhaust gas to the catalyst activation temperature or higher by the multi-injection for a few minutes at the beginning of the regeneration and thereafter raising the temperature of the exhaust gas to 600° C. by the post-injection.

After the injection quantity of the fuel at the time of normal drive has been decreased from the upland full-load injection quantity to the upland drive regeneration injection quantity, the decreased fuel quantity is used in the post-injection to perform the regeneration operation.

Once the DPD 25 has been regenerated by the regeneration operation, the vehicle is switched back to the upland normal drive mode by shifting from the upland regeneration drive characteristic lines 41*b* and 41*c* to the full-load performance characteristic lines 40*b* and 40*c*, as illustrated in FIG. 3(*c*). At this time, the injection quantity of the fuel is gradually increased back to the upland full-load injection quantity as indicated by an arrow 43 so as not to cause abrupt torque fluctuation upon switching.

The vehicle travels in the normal drive mode about 95% of the time and in the regeneration mode about 5% of the time. By operating the normal drive mode performed 95% of the time with the maximum engine performance and gradually degrading it to be the engine performance of the drive mode in the regeneration mode at the time of regeneration, it would be possible to secure and remarkably improve the engine performance in the upland normal drive mode rather than determining the full-load injection quantity in the normal drive mode in consideration of the quantity required for the post-injection in the regeneration mode performed 5% of the time as conventionally performed.

Figure 2:
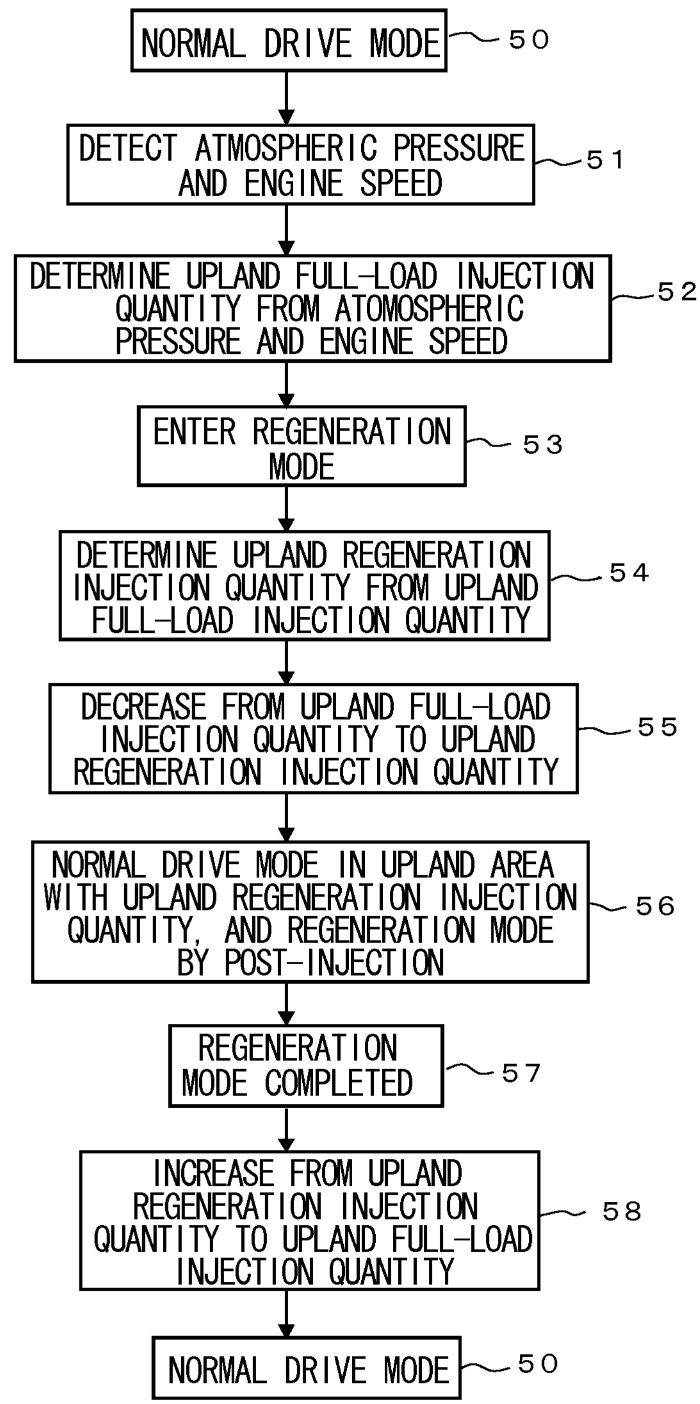
FIG. 2 is a flowchart illustrating a control flow of the present invention.

FIG. 2 is a flowchart illustrating a control flow of the ECU 32 that switches the mode from the normal drive mode to the regeneration mode in the aforementioned exhaust gas treatment system.

As illustrated in FIG. 2, the atmospheric pressure and the engine speed are detected (51) while the vehicle is in motion in the drive mode (50). On the basis of the detected values, the upland full-load injection quantity is determined (52) from the full-load performance characteristic lines 40*b* and 40*c* in the map illustrated in FIG. 3(*a*) so that the vehicle travels in the upland normal drive mode. When the certain amount of the PM has been accumulated in the DPD, the ECU 32 enters the regeneration mode (53) and determines the upland drive regeneration injection quantity (54) on the basis of the upland regeneration drive characteristic lines 41_b_ and 41_c_ from the upland full-load injection quantity based on the full-load performance characteristic lines 40_b_ and 40_c_ illustrated in FIG. 3(_b_). The ECU 32 then decreases the injection quantity of the fuel from the upland full-load injection quantity to the upland drive regeneration injection quantity (55) and, with the upland drive regeneration injection quantity, drives the vehicle in the upland normal drive mode and operates the regeneration mode by the post-injection (56). Once the operation of the regeneration mode is completed (57), the post-injection is stopped, the injection quantity of the fuel is increased from the upland drive regeneration injection quantity to the upland full-load injection quantity (58), and the vehicle is switched back to the normal drive mode (50).

As described above, the present invention can improve the full-load performance by driving the vehicle with the upland full-load injection quantity with which the maximum engine performance based on the atmospheric pressure can be obtained, when driving in the upland area in the normal drive mode. Moreover, when the regeneration mode is operated during the upland normal drive, the injection quantity of the fuel is set equal to the upland regeneration drive injection quantity obtained by subtracting the quantity required for the post-injection from the upland full-load injection quantity, whereby the DPD is regenerated without difficulty. At the same time, there would be no abrupt change in the torque by decreasing the injection quantity from the upland full-load injection quantity to the upland regeneration drive injection quantity at the beginning of the regeneration and by increasing the injection quantity back to the upland full-load injection quantity after completing the regeneration, thereby maintaining the excellent drivability.

The invention claimed is:

1. An exhaust gas purification system, for a diesel engine of a vehicle, comprising:

a diesel particulate diffuser connected to an exhaust pipe of the diesel engine for trapping particulate matter contained in exhaust gas;

an atmospheric pressure sensor to detect an atmospheric pressure in which the vehicle is operating;

an engine speed sensor to detect a speed at which the vehicle is operating; and a controller receiving input from the atmospheric sensor and the engine speed sensor, wherein the controller is configured to— determine an altitude at which the vehicle is operating, control a regeneration mode for an automatic regeneration of the diesel particulate diffuser by performing multi-injection and post-injection to raise a temperature of the exhaust gas, when an amount of the particulate matter in the diesel particulate diffuser has reached a certain amount or more during a normal drive mode determine a high altitude full-load injection quantity from the detected atmospheric pressure in an area determined as high altitude and the detected engine speed, when the vehicle is in the normal drive mode and drives the vehicle with the high altitude full-load injection quantity determined, determine a high altitude drive regeneration injection quantity by decreasing the high altitude full-load injection quantity on a basis of an injection quantity required for the post-injection, when the vehicle is in the regeneration mode, gradually decrease the high altitude full-load injection quantity to the high altitude regeneration drive injection quantity, when the vehicle switches from the normal drive mode in the high altitude area to a high altitude regeneration mode, and by using the decreased quantity for the post-injection, increases high altitude regeneration drive injection quantity to the high altitude full-load injection quantity, after the regeneration is completed, and wherein, during the regeneration mode, a temperature of the exhaust gas is raised to a catalyst activation temperature of the diesel particulate diffuser or higher by performing the multi-injection while decreasing the high altitude full-load injection quantity to the high altitude regeneration drive injection quantity to be used in the normal drive mode, and a difference between the high altitude regeneration drive injection quantity and the high altitude full-load injection quantity is used for the post-injection.

2. The exhaust gas purification system according to claim 1, further comprising:

a map in which a full-load injection quantity of a fuel corresponding to the detected engine speed is set on the basis of an air-fuel ratio for atmospheric pressures in the high altitude area, wherein the high altitude full-load injection quantity required in the normal drive mode in the high altitude area is determined by the map on a basis of the detected atmospheric pressure at the determined altitude in the high altitude area and the detected engine speed while the vehicle is in motion.

3. The exhaust gas purification system according to claim 2, wherein the high altitude full-load injection quantity required in the normal drive mode in the high altitude area is determined by the detected engine speed on a basis of a full-load performance characteristic line that is based on the determined altitude and selected from the map.

4. An exhaust gas purification system, comprising:

a diesel particulate diffuser connected to an exhaust pipe of a diesel engine for trapping particulate matter contained in exhaust gas, the exhaust gas purification system having a regeneration mode for automatically regenerating the diesel particulate diffuser by performing multi-injection and post-injection to raise a temperature of the exhaust gas from the diesel engine when an amount of the particulate matter in the diesel particulate diffuser has reached a certain amount or more during a normal drive mode, wherein the exhaust gas purification system determines a high altitude full-load injection quantity from atmospheric pressure in the high altitude area and an engine speed when a vehicle is in motion in the normal drive mode in the high altitude area and drives the vehicle with the injection quantity determined, determines the high altitude drive regeneration injection quantity obtained by decreasing the high altitude full-load injection quantity on the basis of a quantity required for the post-injection when the vehicle is in the regeneration mode, gradually decreases an injection quantity from the high altitude full-load injection quantity to the high altitude regeneration drive injection quantity when the vehicle switches from the normal drive mode in the high altitude area to a high altitude regeneration mode and, by using the decreased quantity for the post-injection, increases the injection quantity from the high altitude regeneration drive injection quantity to the high altitude full-load injection quantity after the regeneration is completed, wherein, during the regeneration mode, the temperature of the exhaust gas is raised to a catalyst activation temperature of the diesel particulate diffuser or higher by performing the multi-injection while decreasing the high altitude full-load injection quantity to the high altitude regeneration drive injection quantity to be used in the normal drive mode, and a difference between the upland high altitude regeneration drive injection quantity and the high altitude full-load injection quantity is allotted to the post-injection.

5. An exhaust gas purification system, comprising:

a diesel particulate diffuser connected to an exhaust pipe of a diesel engine for trapping particulate matter contained in exhaust gas, the exhaust gas purification system having a regeneration mode for automatically regenerating the diesel particulate diffuser by performing multi-injection and post-injection to raise a temperature of the exhaust gas from the diesel engine when an amount of the particulate matter in the diesel particulate diffuser has reached a certain amount or more during a normal drive mode, wherein the exhaust gas purification system determines a high altitude full-load injection quantity from atmospheric pressure in a high altitude area and an engine speed when a vehicle is in motion in the normal drive mode in the high altitude area and drives the vehicle with the injection quantity determined, determines a high altitude drive regeneration injection quantity obtained by decreasing the high altitude full-load injection quantity on the basis of a quantity required for the post-injection when the vehicle is in the regeneration mode, gradually, decreases an injection quantity from the high altitude full-load injection quantity to the high altitude regeneration drive injection quantity when the vehicle switches from the normal drive mode in the high altitude area to a high altitude regeneration mode and, by using the decreased quantity for the post-injection, increases the injection quantity from the high altitude regeneration drive injection quantity to the high altitude full-load injection quantity after the regeneration is completed, a map in which a full-load injection quantity of a fuel corresponding to the engine speed is set on a basis of an air-fuel ratio for each atmospheric pressure in the high altitude area, wherein the high altitude full-load injection quantity required in the normal drive mode in the high altitude area is determined by the map on the basis of the atmospheric pressure at the altitude in the high altitude area and the engine speed while the vehicle is in motion, wherein, during the regeneration mode, the temperature of the exhaust gas is raised to a catalyst activation temperature of the diesel particulate diffuser or higher by performing the multi-injection while decreasing the high altitude full-load injection quantity to the high altitude regeneration drive injection quantity to be used in the normal drive mode, and a difference between the high altitude regeneration drive injection quantity and the high altitude full-load injection quantity is allotted to the post-injection.

6. An exhaust gas purification system, comprising:

a diesel particulate diffuser connected to an exhaust pipe of a diesel engine for trapping particulate matter contained in exhaust gas, the exhaust gas purification system having a regeneration mode for automatically regenerating the diesel particulate diffuser by performing multi-injection and post-injection to raise a temperature of the exhaust gas from the diesel engine when an amount of the particulate matter in the diesel particulate diffuser has reached a certain amount or more during a normal drive mode, wherein the exhaust gas purification system determines a high altitude full-load injection quantity from atmospheric pressure in high altitude area and an engine speed when a vehicle is in motion in the normal drive mode in the high altitude area and drives the vehicle with the injection quantity determined, determines a high altitude drive regeneration injection quantity obtained by decreasing the high altitude full-load injection quantity on the basis of a quantity required for the post-injection when the vehicle is in the regeneration mode, gradually decreases an injection quantity from the high altitude full-load injection quantity to the high altitude regeneration drive injection quantity when the vehicle switches from the normal drive mode in the high altitude area to a high altitude regeneration mode and, by using the decreased quantity for the post-injection, increases the injection quantity from the high altitude regeneration drive injection quantity to the high altitude full-load injection quantity after the regeneration is completed, a map in which a full-load injection quantity of a fuel corresponding to the engine speed is set on a basis of an air-fuel ratio for each atmospheric pressure in the high altitude area, wherein the high altitude full-load injection quantity required in the normal drive mode in the high altitude area is determined by the map on the basis of the atmospheric pressure at the altitude in the high altitude area and the engine speed while the vehicle is in motion, wherein the high altitude full-load injection quantity required in the normal drive mode in the high altitude area is determined by the engine speed on the basis of a full-load performance characteristic line that is based on the altitude and selected from the map, wherein, during the regeneration mode, the temperature of the exhaust gas is raised to a catalyst activation temperature of the diesel particulate diffuser or higher by performing the multi-injection while decreasing the high altitude full-load injection quantity to the high altitude regeneration drive injection quantity to be used in the normal drive mode, and a difference between the high altitude regeneration drive injection quantity and the high altitude full-load injection quantity is allotted to the post-injection.

* * * * *